(12) United States Patent
Sun et al.

(10) Patent No.: US 9,842,707 B2
(45) Date of Patent: Dec. 12, 2017

(54) BAMBOO-INSPIRED NANOSTRUCTURE DESIGN FOR FLEXIBLE, FOLDABLE AND TWISTABLE ENERGY STORAGE DEVICES

(71) Applicant: The Board of Trustees of the Leland Stanford Junior University, Palo Alto, CA (US)

(72) Inventors: Yongming Sun, Palo Alto, CA (US); Yi Cui, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 22 days.

(21) Appl. No.: 15/149,631

(22) Filed: May 9, 2016

(65) Prior Publication Data

US 2017/0125174 A1 May 4, 2017

Related U.S. Application Data

(60) Provisional application No. 62/164,391, filed on May 20, 2015.

(51) Int. Cl.
*H01G 11/86* (2013.01)
*D01D 5/00* (2006.01)
(Continued)

(52) U.S. Cl.
CPC ............ *H01G 11/86* (2013.01); *D01D 5/003* (2013.01); *D01D 5/247* (2013.01); *D01D 10/02* (2013.01); *D01F 1/08* (2013.01); *D01F 9/22* (2013.01); *D01F 11/10* (2013.01); *D01F 11/16* (2013.01); *D04H 1/4242* (2013.01); *D04H 1/4382* (2013.01); *D04H 1/728* (2013.01); *H01G 11/24* (2013.01); *H01G 11/26* (2013.01); *H01G 11/36* (2013.01); *H01G 11/70* (2013.01); *H01M 4/663* (2013.01); *H01M 4/75* (2013.01)

(58) Field of Classification Search
None
See application file for complete search history.

(56) References Cited

U.S. PATENT DOCUMENTS

| | | | |
|---|---|---|---|
| 2008/0170982 A1* | 7/2008 | Zhang | B82Y 10/00 423/447.3 |
| 2011/0081394 A1* | 4/2011 | Zussman | B82Y 30/00 424/422 |

(Continued)

OTHER PUBLICATIONS

Jianshe Huang and Tianyan You, "Advances in Nanofibers", Nanotechnology and Nanomaterials, CH. 2, pp. 35-85, ISBN, Dec. 11, 2013.

*Primary Examiner* — Don R Ferguson
(74) *Attorney, Agent, or Firm* — Lumen Patent Firm

(57) ABSTRACT

A flexible all-solid state supercapacitor is provided that includes a first electrode and a second electrode, and a flexible nanofiber web, where the flexible nanofiber web connects the first electrode to the second electrode, where the flexible nanofiber web includes a plurality of flexible nanofibers, where the flexible nanofiber includes a hierarchal structure of macropores, mesopores and micropores through a cross section of the flexible nanofiber, where the mesopores and the micropores form a graded pore structure, where the macropores are periodically distributed along the flexible nanaofiber and within the graded pore structure.

9 Claims, 5 Drawing Sheets

(51) Int. Cl.
*D01F 9/22* (2006.01)
*D04H 1/728* (2012.01)
*D04H 1/4242* (2012.01)
*D04H 1/4382* (2012.01)
*H01M 4/66* (2006.01)
*H01M 4/75* (2006.01)
*H01G 11/24* (2013.01)
*H01G 11/26* (2013.01)
*D01D 5/247* (2006.01)
*D01D 10/02* (2006.01)
*D01F 1/08* (2006.01)
*D01F 11/10* (2006.01)
*D01F 11/16* (2006.01)
*H01G 11/36* (2013.01)
*H01G 11/70* (2013.01)

(56) References Cited

U.S. PATENT DOCUMENTS

2013/0034804 A1* 2/2013 Hong ............... H01G 11/40
   429/532
2013/0295374 A1* 11/2013 Tang ............... B82B 1/002
   428/323

* cited by examiner

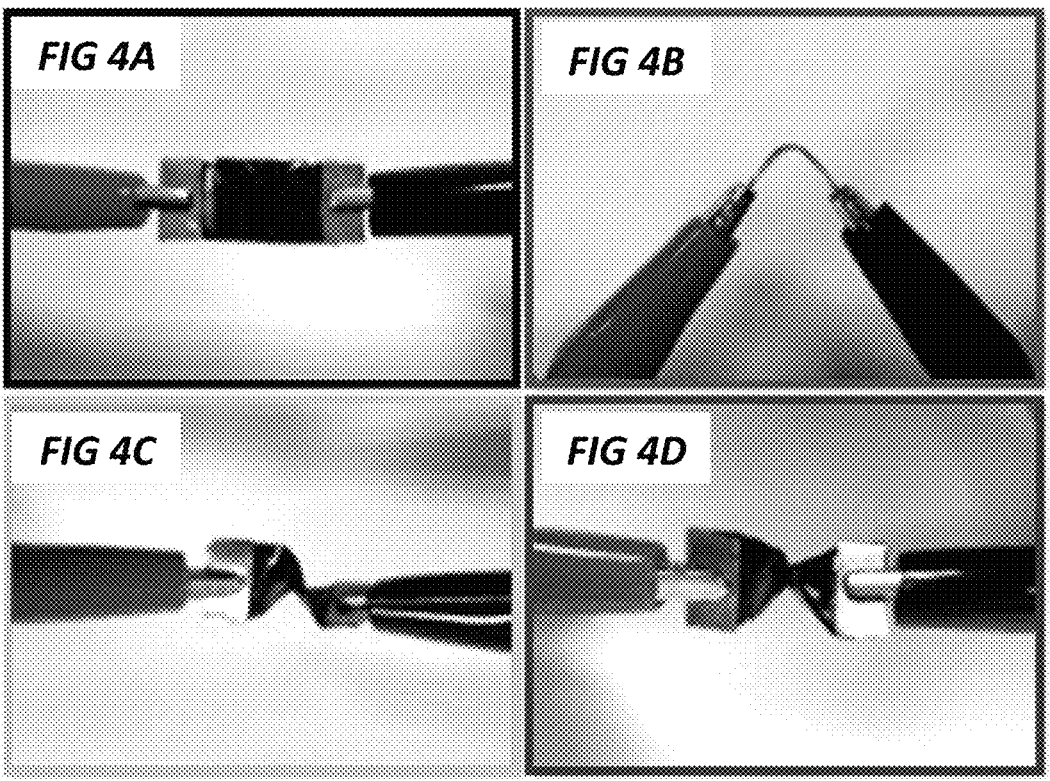

BAMBOO-INSPIRED NANOSTRUCTURE DESIGN FOR FLEXIBLE, FOLDABLE AND TWISTABLE ENERGY STORAGE DEVICES

CROSS-REFERENCE TO RELATED APPLICATIONS

This application claims priority from U.S. Provisional Patent Application 62/164,391 filed May 20, 2015, which is incorporated herein by reference.

FIELD OF THE INVENTION

The present invention relates generally to solid state supercapacitors. More particularly, the invention relates to a bamboo-like graphitic carbon nanofiber having excellent mechanical properties and electrochemical performance having high surface area accessible to the electrolyte and low ion-transport resistance.

BACKGROUND OF THE INVENTION

Flexible electronics is aimed to be portable, lightweight, bendable, foldable, twistable, and even wearable. Due to these features, the corresponding power sources should be lightweight and stable under different mechanical deformation conditions. Recently, much progress has been made in the development of flexible all-solid-state supercapacitors for flexible electronics owing to their ease of handing, small size, and safety. The main limitations, however, are their low volumetric energy density and limited mechanical durability. A typical fabrication procedure of an all-solid-state supercapacitor includes the synthesis of active materials on a conductive and flexible substrate, followed by assembly into devices using a gel electrolyte. However, little emphasis has been placed on the development of free-standing flexible active materials without the need for extra support, which is vital for the improvement of energy and power densities based on the volume of the whole devices. In this respect, some progress has been made in the design of graphene-based film electrodes for all-solid-state supercapacitors. Carbon nanotube architectures have also been successfully designed as a mechanical support to develop fiber type supercapacitors with superior mechanical durability. In spite of this progress, the energy density of the devices is still limited by the use of flexible but inert substrates or the large proportion of the low-specific-capacitance carbon nanotubes. In other words, an ideal electrode material for flexible all-solid-state supercapacitors should possess high specific capacitance and be highly flexible by itself without the need for mechanical support. However, to date, there are very few successful examples of such all-solid-state supercapacitors showing stable electrochemical performances under continuous dynamic mechanical deformation.

What is needed is a flexible free-standing all-solid-state supercapacitor for flexible electronics.

SUMMARY OF THE INVENTION

To address the needs in the art a flexible all-solid state supercapacitor is provided that includes a first electrode and a second electrode, and a flexible nanofiber web, where the flexible nanofiber web connects the first electrode to the second electrode, where the flexible nanofiber web includes a plurality of flexible nanofibers, where the flexible nanofiber includes a hierarchal structure of macropores, mesopores and micropores through a cross section of the flexible nanofiber, where the mesopores and the micropores form a graded pore structure, where the macropores are periodically distributed along the flexible nanaofiber and within the graded pore structure.

According to one aspect of the invention the macropores have a diameter in a range of 50 nm to 200 nm.

In another aspect of the invention, the mesopores have a diameter in a range of 2 nm to 50 nm.

In a further aspect of the invention, the micropores have a diameter in a range of up to 2 nm.

According to one embodiment of the invention, a method of fabricating flexible nanofibers is provided that includes electrospinning a precursor of polyacrylonitrile (PAN) and tetraethylorthosilicate (TEOS) in dimethylformamide (DMF) to form a TEOS/PAN web of nanofibers, thermal treating the TEOS/PAN web of nanofibers in an $H_2$/Ar or an inert atmosphere, and etching the TEOS/PAN web of nanofibers with $SiO_2$ in an aqueous HF solution while thermal treating, where uniform $SiO_2$ molecular clusters are distributed inside the electrospun nanofibers, where the $SiO_2$ molecular clusters transfer inward and aggregate to $SiO_2$ particles proximal to an axial center of the nanofiber, where a path of the transfer forms a graded and interconnected pore structure within the nanofiber, where the graded and interconnected pore structure include mesopores and micropores through a cross section of the nanofiber, where said PAN is carbonized, where etching said $SiO_2$ particles forms a sequence of spherical macropores that are uniformly distributed along the axis of the nanofiber, where a structure of graded and interconnected micropores and mesopores form a shell around the macropores along the nanowire, where the thermal treating forms a black carbon flexible nanofiber network.

In one aspect of the current embodiment, the flexible nanofibers are conductive current collectors for battery electrodes.

In another aspect of the current embodiment, the macropores have a diameter in a range of 50 nm to 200 nm.

In a further aspect of the current embodiment, the mesopores have a diameter in a range of 2 nm to 50 nm.

In yet another aspect of the current embodiment, the micropores have a diameter in a range of up to 2 nm.

BRIEF DESCRIPTION OF THE DRAWINGS

FIGS. 4A-4D show a supercapacitor made from the flexible bamboo-like carbon nanofiber web being twisted and folded without damage, according to one embodiment of the invention.

DETAILED DESCRIPTION

Figure 1A:
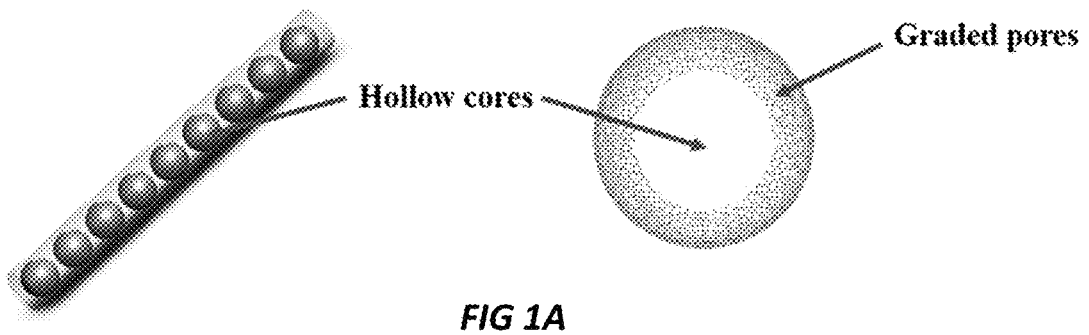
FIGS. 1A-1B show (1A) a schematic drawing of the bamboo-inspired flexible nanostructure, (1b) results from three-point bending simulations of different fiber geometries: solid fiber, tube, bamboo-like fiber with hollow cores (Bamboo), and fully porous bamboo-like fiber with both hollow cores and graded pores through the cross section (Bamboo, 0.04 E) according to one embodiment of the invention.
Figure 1B:
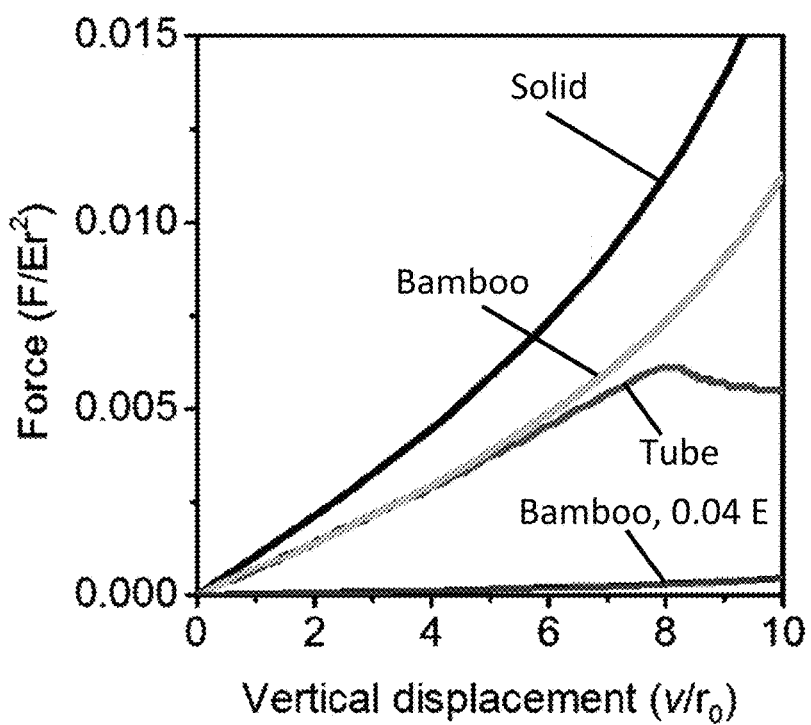
Figure 2A:
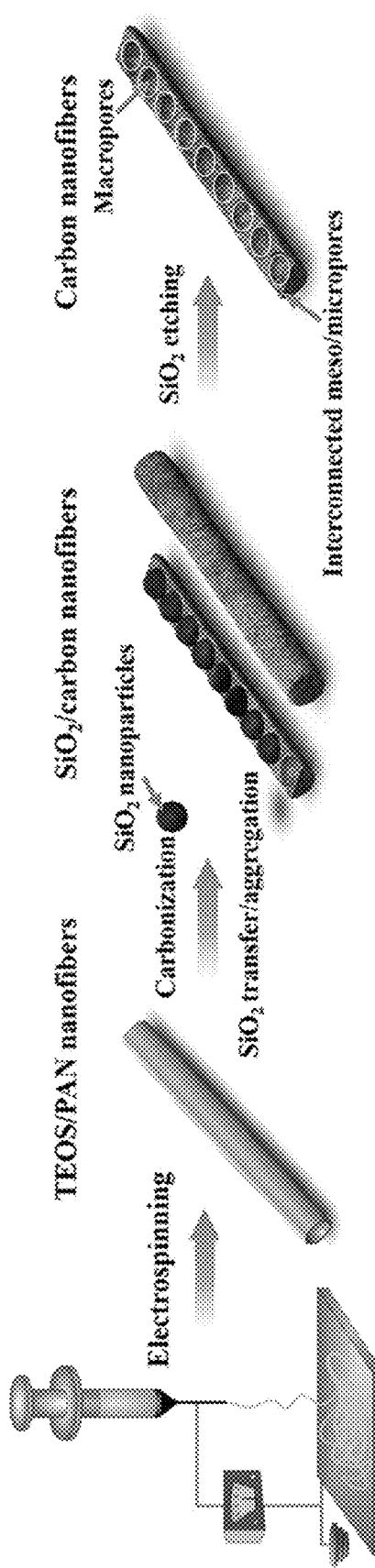
FIGS. 2A-2C show (2A) a schematic drawing of the fabrication process of the bamboo-like carbon nanofibers, where TEOS/PAN composite nanofibers were first prepared by electrospinning, then heating the precursors at 1200° C. in a $H_2$/Ar (5/95 in volume) atmosphere, ultrafine $SiO_2$ clusters transfer and aggregate into much larger $SiO_2$ particles uniformly lined in the core region within the nanofibers, while their transfer path forms interconnected and graded meso/micropores, further the bamboo-like nanofibers are finally obtained after removing the SiO2 particles in a HF aqueous solution; (2B-2C) TEM images of the initial TEOS/PAN composite nanofibers, according to one embodiment of the invention.
Figure 2C:
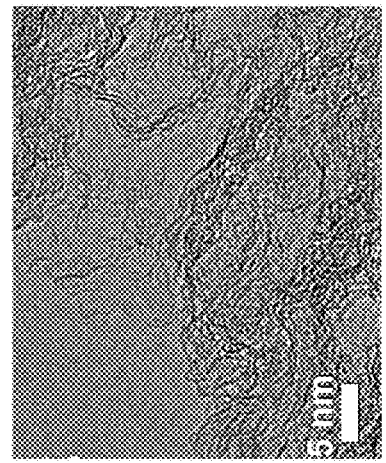
Figure 2B:
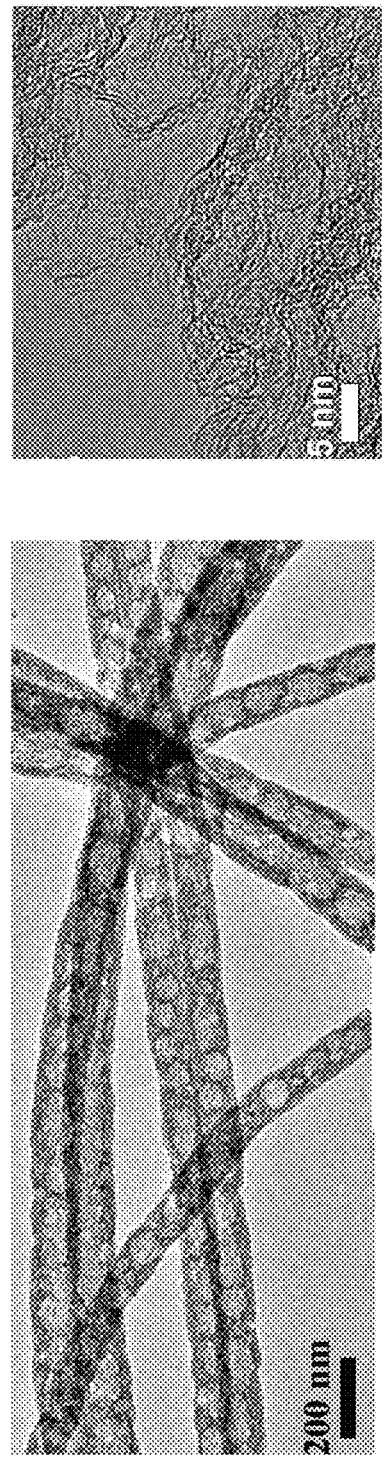

Bamboo is a representative example of plants that possess superior flexibility and mechanical durability. Its geometry consists of a functionally graded structure from macroscopic scale to microscopic scale that is adapted to withstand the forces of nature, where the "nodes" provide additional reinforcement for the "culm", preventing buckling due to bending and axial cracks. The graded structure of the fibers through their cross-section accommodates the stress distribution due to a bending moment and thus optimizes the flexural properties. Here, inspired by the structure of bamboo, provided is a novel, multiscale, hierarchical carbon nanostructure. Such a device has the following characteristics: 1D graphitic nanofibers with uniform discontinuous hollow interiors (macropores) as well as graded nanopores (mesopores and micropores) through the cross-section of the nanofibers (FIG. 1A). These hierarchical and well-balanced macro-, meso- and microporosities help to provide a high ion-accessible surface area and low ion transport resistance, which are the keys to achieving high specific capacitance and rate capability in electrical double-layer capacitors. Meanwhile, superior mechanical durability and flexibility can also be expected in terms of the unique pore structure. The micro/mesopores account for 79% of the porosity (based on high-resolution nitrogen-sorption analyses). According to theoretical and empirical estimates, they act to reduce the global elastic modulus of the nanofibers, the parameter that controls the deformation response to loading over length scales much larger than the micro/mesopore diameters, to approximately 4% of the base material's value. This reduction in the global modulus results in an overall reduction in stiffness of the nanofibers, making the load required to sustain the same amount of deformation about a factor of 20 lower. Second, the macropores that give the nanofibers their bamboo-like hollow cores also act to reduce the stiffness both globally, by lowering the overall moment of inertia, and locally, by providing thin, flexible regions at the walls of the pores. Additionally, the reinforcement provided by the webs of material separating the macropores give the bamboo-like nanofibers the important property of robustness against localized deformation. To demonstrate this effect, a series of three-point bending simulations were conducted for a solid fiber, a bamboo-like fiber, and a tubular fiber of equivalent moment of inertia to the bamboo-like fiber (FIG. 1B). Clearly the stiffnesses of the bamboo-like and tubular fibers are reduced relative to the solid fiber. Additionally, it is shown that in the case of the tubular fiber, the deformation becomes highly localized as the tube "crimps" together. In contrast, the bamboo-like fiber maintains the same cross-sectional form at the site of loading, indicating it is much more robust. Hence, the bamboo-like fibers are much better at sharing/shedding load in the 2D webs comprising the supercapacitors without inducing localized failure. The schematic of the fabrication process of the bamboo-like carbon nanofibers is shown in FIG. 2A. In a typical procedure, a precursor of polyacrylonitrile (PAN) and tetraethyl orthosilicate (TEOS) in dimethylformamide (DMF) was made into a white nanofiber web by electrospinning (Supporting Information, Figures S1 and S2). Black carbon nanofiber network electrodes were then obtained after thermal treatment of these TEOS/PAN nanofiber webs in a $H_2$/Ar (5/95 in volume) atmosphere followed by etching $SiO_2$ in an aqueous HF solution. The $SiO_2$ molecular clusters are very uniformly distributed within the as-electrospun nanofibers. In the heat treatment process, these ultrafine $SiO_2$ clusters transfer inward and aggregate into much larger $SiO_2$ particles (tens of nanometers in size) in the center of the nanofibers, while their transfer path forms a graded and interconnected pore structure within the shell of the hybrid nanofibers, accompanied by the carbonization of PAN. Etching these $SiO_2$ particles generates a sequence of spherical holes uniformly distributed along the axes of the nanofibers (FIG. 2B). These hollow interiors, together with a graded and interconnected pore structure: small micro/mesopores in the outer surface and larger mesopores in the inner region of the shell, endow the as-synthesized carbon nanofibers with a unique porous architecture. Meanwhile, these bamboo-like carbon nanofibers interconnect with each other, forming a tight 2D web with submicron/micron size interfiber porosity. The pore-size distribution, pore volume, and specific surface area (SSA) of the carbon nanofibers were studied using high-resolution nitrogen-sorption experiments with advanced methods based on density functional theory (DFT). The bamboo-like carbon nanofibers have a continuous pore-size distribution from 0.64 nm to over 100 nm. Their SSA is as high as ~1912 $m^2 \ g^{-1}$, and their pore volume is ~2.27 $cm^3 \ g^{-1}$. Furthermore, their porosity and SSA can be tuned by controlling the diffusion of the $SiO_2$ clusters in the fibers, indicating great versatility in manipulating the pore structure. A high resolution transmission electron microscopy (HRTEM) image shows that the shells of these bamboo-like carbon nanofibers consist of interconnected and highly curved graphitic carbon nanosheets, supporting their superior structural flexibility and electrical conductivity (FIG. 2C).

Figure 3A:
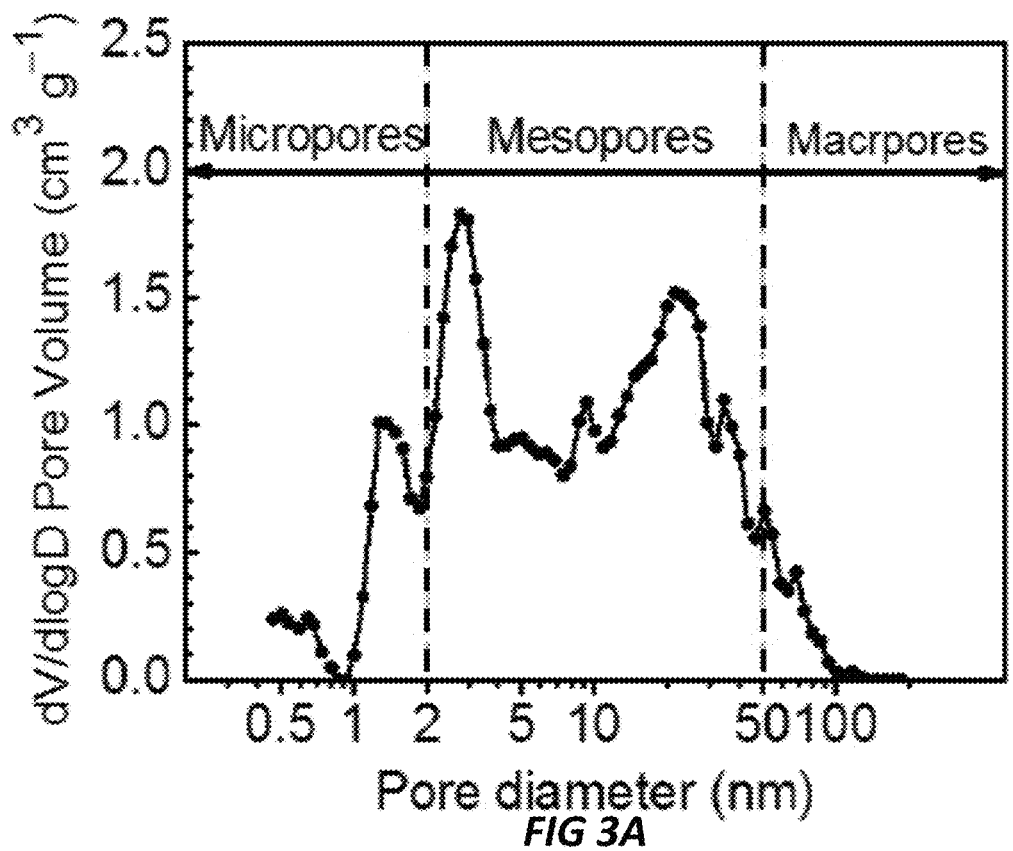
FIGS. 3A-3B show graphs of (3A) pore volume vs. pore diameter for micropores, mesopores and macropores, (3B) cumulative surface area vs. pore width for micropores, mesopores and macropores, according to one embodiment of the invention.
Figure 3B:
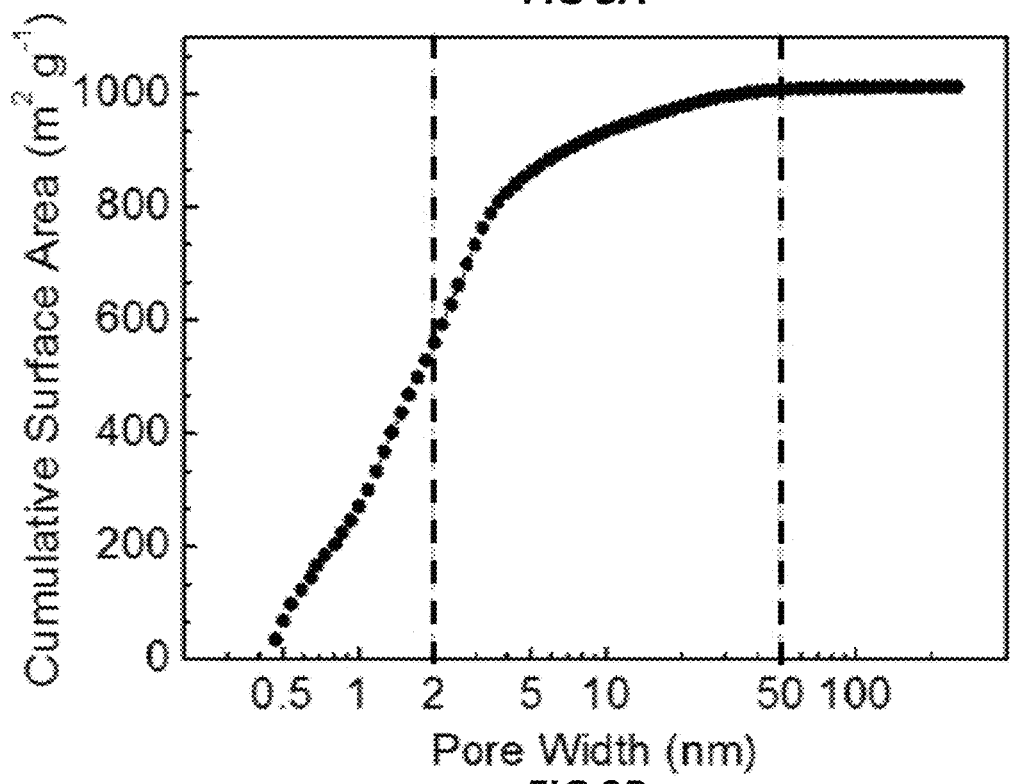
Figure 5A:
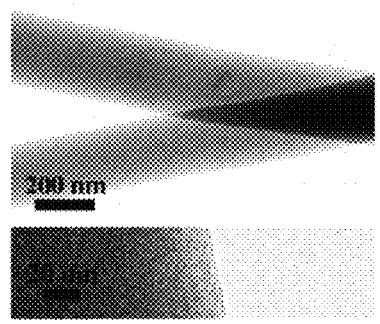
FIGS. 5A-5H show Transmission electron microscopy (TEM) images of carbon nanofibers with tunable pore structures. Various carbon nanofibers with tunable pore structures: Carbon nanofibers prepared via heat treatment at different temperatures: (5A) 600, (5B) 800, (5C) 1000, (5D) 1100 and (5E) 1300° C., respectively. Carbon nanofibers prepared with various TEOS/PAN mass ratios: (5F) 0, (5G) 1 and (5H) 1.8, respectively, according to embodiments of the current invention.
Figure 5B:
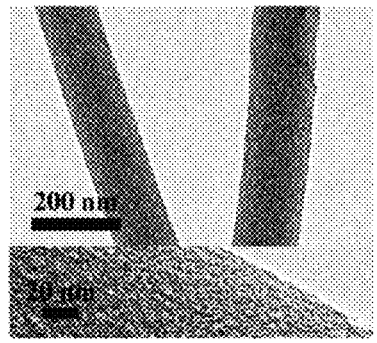
Figure 5C:
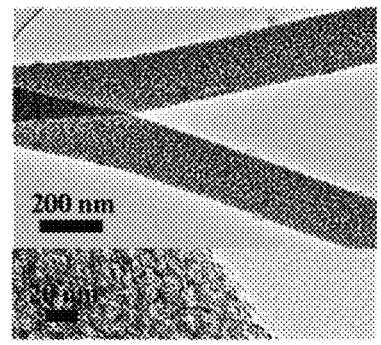
Figure 5D:
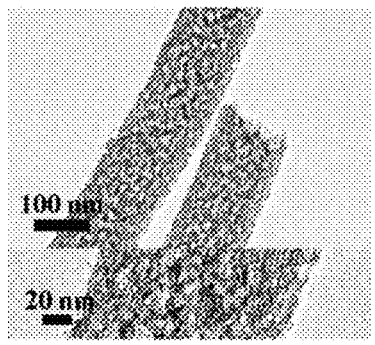
Figure 5E:
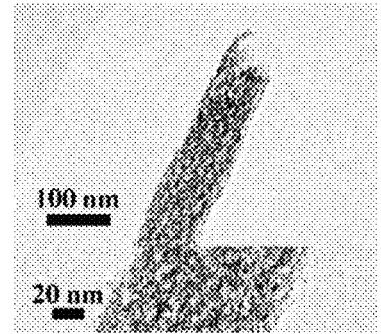
Figure 5F:
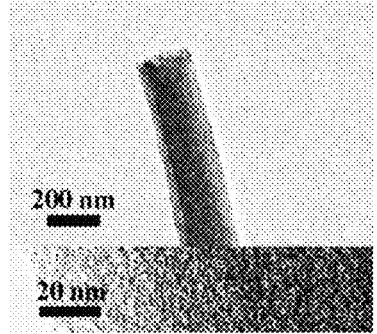
Figure 5G:
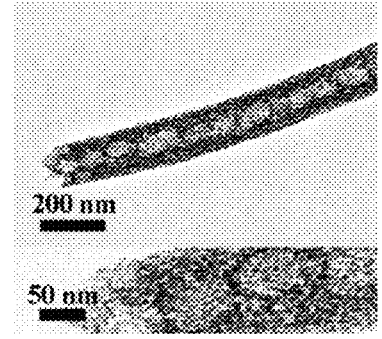
Figure 5H:
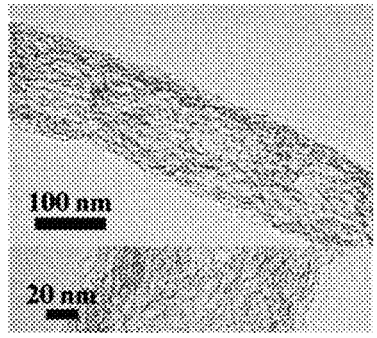

FIGS. 3A-3B show graphs of (3A) pore volume vs. pore diameter for micropores, mesopores and macropores, (3B) cumulative surface area vs. pore width for micropores, mesopores and macropores, according to one embodiment of the invention.

Detailed structure characterization, including electron energy loss spectroscopy (EELS), powder X-ray diffraction (XRD), X-ray photoelectron spectroscopy (XPS), elemental analysis, and Raman spectroscopy, further confirm their graphitic carbon structure.

Due to the bamboo-like fiber structure and tight organization of the 2D fibrous felts, the carbon nanofiber network electrode is flexible, foldable, and pliable. The prepared carbon membrane recovers its initial state easily after 3-folded manipulation, indicating its excellent mechanical durability. Furthermore, TEM measurement was carried out to observe the mechanical durability of the bamboo-like carbon nanofibers. Before observation, a carbon fiber web was folded (180°), twisted (180°), extruded, and sandwiched between two TEM copper grids. It was confirmed that the fibrous structure was well maintained even after being highly bent and twisted (FIGS. 4A-4D). After being unloaded, the fibers recover their initial states, indicating extraordinary mechanical flexibility, foldability and twistability. To study the fracture mechanism of our bamboo-like carbon nanofibers, a piece of carbon nanofiber web was bent, twisted and stretched forcefully and observed it under a TEM, where the carbon nanofibers did not break by cleavage fracture. Damaged fibers were observed to retain connected remnants, indicating a high energy dissipation rate. For comparison, a membrane was prepared having carbon nanofibers with negligible porosity and SSA, and a bending operation was also carried out. With a very small bending angle (<50°), the web of solid carbon nanofibers fractured easily, and a flat cross-section was observed, indicating a low energy dissipation rate.

Here, the capacitive properties of the bamboo-like carbon nanofiber webs were explored by using a traditional three-electrode configuration in a liquid electrolyte. Typical cyclic voltammetry (CV) curves at various scan rates between 10 and 2000 mV s$^{-1}$ were obtained, within a potential range of −0.9 to 0 V (vs Hg/HgO). Rectangular shapes of the CVs are obtained even at a very high scan rate of 2000 mV s$^{-1}$, indicating a very fast and efficient charge transfer. A nearly triangular shape of the galvanostatic charge/discharge curves obtained at a high current density of 100 A g$^{-1}$ suggest the formation of efficient electrochemical double layers and fast ion transport within the carbon nanofiber electrodes. The as-made carbon nanofiber electrodes exhibit an outstanding specific capacitance as high as 236 F g$^{-1}$ at a current density of 5 A g$^{-1}$ and show a very small decrease in gravimetric capacitance even at very high current densities (~30% at 100 A g$^{-1}$). Meanwhile, the electrodes also display an extraordinarily high stability with ~100% of the initial capacitance after 5000 cycles tested at a constant current density of 10 A g$^{-1}$. The bamboo-like carbon nanofiber web, possessing inherent 3D interconnected hierarchical porous structures with high SSA, supports its potential applications for high-performance supercapacitors. The large and accessible SSA to the electrolyte enables high specific capacitance. The superior rate capability can be ascribed to the highly conductive pathway for electrons and fast transport channels for ions. Previous studies indicated that the power characteristics of many carbon materials remains limited due to an intrinsically high fraction of microporosity, which in turn limits pore accessibility of the electrolyte ions at high current densities. Here, the bamboo-like porous carbon nanoarchitecture is successful in achieving high power density as well as keeping high energy density by creating facile electron/ion-transport pathways. With the combination of superior electrochemical properties and mechanical durability, the bamboo-like carbon nanofiber webs are promising candidates for flexible all-solid-state supercapacitor electrodes.

To explore the electrochemical performances of the as-synthesized bamboo-like carbon nanofiber webs as all-solid-state supercapacitor electrodes, symmetric supercapacitors can be readily made by sandwiching a cellulose separator between two identical carbon nanofiber web electrodes. The freestanding carbon nanofiber webs serve as both the active material and current collector in the two-electrode cell configuration because of their good conductivity. Moreover, the as-made devices do not require any flexible substrates (e.g., polyethylene terephthalate substrate, conductive aluminum foil, and nitrocellulose membrane) due to the superior mechanical durability of the bamboo-like carbon nanofiber webs. The thickness of devices is tunable by selecting carbon nanofiber webs with different thicknesses, making them potentially useful in microdevice applications. It has been recognized that supercapacitor electrodes comprising of an active material coating layer on flexible conductive support (e.g., a carbon cloth) and an active thin film on a flexible substrate (e.g., polyethylene terephthalate) usually have a smaller internal resistance and better ion diffusion characteristics to achieve a higher apparent specific capacitance when normalized by the weight of the active materials. However, high energy and power densities cannot always be obtained on the basis of the total volume or weight of the devices due to the presence of inactive current collectors or flexible substrates. In this respect, the content ratio of the active materials in the as-made devices is greatly increased, which leads to the increase of energy and power densities based on the entire devices. The electro-chemical performances of the as-made devices were tested after the gel electrolyte dried and all of the measurements were based on the total volume of the devices. The capacitive performance of the flexible all-solid-state supercapacitors was first evaluated by CV measurements. CV curves of the device at various scan rates with voltage windows ranging from 0 to 0.9 V were taken, where the shape of the CV loop of an ideal electrical double-layer supercapacitor should be rectangular. The obtained CV curves of the device according to the current invention are close to rectangular even at a high scan rate of 2000 mV s$^{-1}$, demonstrating an excellent capacitive behavior and a fast charge/discharge property. Typical galvanostatic charge/discharge curves have a linear profile of galvanostatic charge/discharge curves and their symmetric triangular shape indicate nearly ideal capacitive characteristics. The device exhibits a high specific capacitance of 2.1 F cm$^{-3}$ at 33 mA cm$^{-3}$, which is a result that is much higher than those of well-designed carbonaceous supercapacitors reported in the literature (e.g., 0.45 F cm$^{-3}$ based on graphene film electrodes and 1.3 F cm$^{-3}$ with onion-like carbon electrodes) and, even higher than or comparable to those of some metal oxide-based supercapacitors (e.g., 0.7 F cm$^{-3}$ based on H—TiO$_2$@MnO$_2$ and H—TiO$_2$@C electrodes, and 2.5 F cm$^{-3}$ based on carbon/MnO$_2$ core-shell fiber electrodes). Moreover, the capacitance remains 1.6 F cm$^{-3}$ at 3333 mA cm$^{-3}$, demonstrating a good rate capability. The high-rate performance of this device can be attributed to the following aspects: (i) The hierarchical porous structure of the carbon nanofiber webs effectively adsorbs the gel electrolyte and minimizes the ion diffusion distance and transport resistance; (ii) The interconnected conductive network builds up an express path for ultrafast electron transport; (iii) Additional polymer binders are not used, which commonly introduce extra contact resistance and dead weight. The fast ion transport within the carbon nanofiber electrodes was confirmed by the result of electrochemical impedance spectroscopy (EIS). Additionally, the flexible all-solid-state supercapacitors show a stable cycle life in the potential range of 0-0.9 V at 67 mA cm$^{-3}$ and retain 96% of the initial capacitance after 10,000 cycles, indicating excellent cycling stability. Power and energy densities are two important parameters for evaluating the electrochemical performances of the all-solid-state supercapacitors. The specific power and energy densities for our bamboo-like carbon nanofibers are 61.3 kW/kg and 2.37 Wh/kg, respectively. These values are larger or comparable than those typical carbon based active materials for supercapacitors (e.g., 23 kW/kg and 6 Wh/kg for single-walled carbon nanotubes, 33 4 kW/kg and 0.2 Wh/kg for active carbon cloth). Moreover, compared with what is known in the art, the bamboo-like carbon nanofiber membranes work as free-standing electrodes for an all-solid-state supercapacitor. Without the need for extra support, the energy and power densities based on the total mass and volume of the devices are improved greatly. A Ragone plot was prepared that compares the volumetric power and energy densities of the as-prepared device with other energy storage devices designed for high-performance microelectronics, as well as a commercial 2.75/44 mF active carbon electrochemical capacitors (AC-EC), a 500 µAh thin-film lithium battery and a 3 V/300 µF aluminum electrolytic capacitor. The highest energy density of the as-made all-solid-state supercapacitor is $2.4°×10^{-4}$ W h cm$^{-3}$ with a high power density of 6.1 W cm$^{-3}$. This value is much larger than those typical all-solid-state electrochemical capacitors based on graphene ($6°×10^{-5}$ W h cm$^{-3}$) and single-walled carbon nanotubes (SCNTs, $1°×10^{-5}$ W h cm$^{-3}$). Furthermore, the as-made device exhibits better or comparable energy density with a typical metal oxide-based all-solid-state supercapacitor (e.g., device with H—TiO$_2$@MnO$_2$/H—TiO$_2$@C electrodes), metal nitride-based all-solid-state supercapacitor [e.g., device with mesoporous vanadium nitride nanowire-carbon nanotube (MVNN-CNTs) electrodes] and conducting polymer-based all-solid-state supercapacitor [e.g., devices with polypyrrole-paper (PPy-paper) electrodes], but much better power density. Compared with the 500 µAh thin-film lithium battery with low power density and 3 V/300 µF aluminum electrolytic capacitor with low energy density, our device exhibits both high power and energy density, which are also much better than that of the commercial AC-EC. The ability to achieve a high volume/mass capacitance in our work further confirms the importance of the use of self-supporting electrodes without extra current collectors or flexible substrates. This will reduce the device thickness and weight and directly enable us to achieve much larger overall capacitance.

Achieving superior electrochemical performances while maintaining the flexible quality of the supercapacitors is essential to power portable electronic devices and smart garments. The prepared all-solid-state supercapacitor is robust enough to work under different mechanical deformation conditions without degradation in performance. Almost 100% capacitance retention ratio, calculated based on CV curves, was observed for the as-prepared device under continuous dynamic operations of forceful bending and twisting (90°, 180°), and back to the initial status, demonstrating the superior mechanical durability and electrochemical stability. SEM results indicate that even after 10,000 charge/discharge cycles, as well as in situ bending and twisting operations, the initial structure of an as-made device is well-maintained, again confirming its outstanding structural stability and mechanical durability. Specifically, the electrochemical performances of the all-solid-state supercapacitors may be further improved by introducing nanosized pseudocapacitive active materials (e.g., MnO$_2$) into the as-formed carbon nanofiber system, which will open the possibility for assembling all-solid-state devices that meet the requirements of commercialization. The nature-inspired work extends the research frontier on flexible all-solid-state supercapacitors, and opens up new paths to accelerate the development of their advanced applications.

FIGS. 5A-5H show Transmission electron microscopy (TEM) images of carbon nanofibers with tunable pore structures. Various carbon nanofibers with tunable pore structures: Carbon nanofibers prepared via heat treatment at different temperatures: (5A) 600, (5B) 800, (5C) 1000, (5D) 1100 and (5E) 1300° C., respectively. Carbon nanofibers prepared with various TEOS/PAN mass ratios: (5F) 0, (5G) 1 and (5H) 1.8, respectively, according to embodiments of the current invention.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, one has great versatility in manipulating both the macrostructure and the microstructure of the carbon nanofiber webs. The thickness of the webs can be turned by controlling the electrospinning time. The 2D films with desired shapes and sizes can be easily selected by traditional cutting. Further structural modification and control of the carbon nanofiber webs can be achieved by varying the processing temperature and mass ratios of TEOS to PAN in the precursor. Therefore, our synthesis represents substantial progress towards producing carbon nanofibers engineered with tunable porosity, opening diverse functionality that is advantageous for fundamental investigations and numerous, diverse applications. One of the promising application of the flexible carbon nanofibers can be conductive current collectors for battery electrodes.

All such variations are considered to be within the scope and spirit of the present invention as defined by the following claims and their legal equivalents.

What is claimed:

1. A flexible all-solid state supercapacitor, comprising:
   a) a first electrode and a second electrode; and
   b) a flexible nanofiber web, wherein said flexible nanofiber web connects said first electrode to said second electrode, wherein said flexible nanofiber web comprises a plurality of flexible nanofibers, wherein said flexible nanofiber comprises a hierarchal structure of macropores, mesopores and micropores through a cross section of said flexible nanofiber, wherein said mesopores and said micropores form a graded pore structure, wherein said macropores are periodically distributed along said flexible nanaofiber and within said graded pore structure.

2. The flexible all-solid state supercapacitor of claim 1, wherein said macropores have a diameter in a range of 50 nm to 200 nm.

3. The flexible all-solid state supercapacitor of claim 1, wherein said mesopores have a diameter in a range of 2 nm to 50 nm.

4. The flexible all-solid state supercapacitor of claim 1, wherein said micropores have a diameter in a range of up to 2 nm.

5. A method of fabricating flexible nanofibers, comprising: a) electrospinning a precursor of polyacrylonitrile (PAN) and tetraethylorthosilicate (TEOS) in dimethylformamide (DMF) to form a TEOS/PAN web of nanofibers; b) thermal treating said TEOS/PAN web of nanofibers in an H2/Ar or an inert atmosphere; and c) etching said TEOS/PAN web of nanofibers with SiO2 in an aqueous HF solution while said thermal treating, wherein uniform SiO2 molecular clusters are distributed inside said electrospun nanofibers, wherein said SiO2 molecular clusters transfer inward and aggregate to SiO2 particles proximal to an axial center of said nanofiber, wherein a path of said transfer forms a graded and interconnected pore structure within said nanofiber, wherein said graded and interconnected pore structure comprises mesopores and micropores through a cross section of said nanofiber, wherein said PAN is carbonized, wherein etching said SiO2 particles forms a sequence of spherical macropores that are uniformly distributed along said axis of said nanofiber, where a structure of graded and interconnected said micropores and said mesopores form a shell around said macropores along said nanowire, wherein said thermal treating forms a black carbon flexible nanofiber network.

6. The method according to claim 5, wherein said flexible nanofibers are conductive current collectors for battery electrodes.

7. The method according to claim 5, wherein said macropores have a diameter in a range of 50 nm to 200 nm.

8. The method according to claim 5, wherein said mesopores have a diameter in a range of 2 nm to 50 nm.

9. The method according to claim 5, wherein said micropores have a diameter in a range of up to 2 nm.

* * * * *